(12) United States Patent
Yamamoto

(10) Patent No.: US 9,185,267 B2
(45) Date of Patent: Nov. 10, 2015

(54) IMAGE PROCESSING DEVICE, IMAGE PROCESSING METHOD, AND IMAGE PROCESSING PROGRAM

(75) Inventor: Yuko Yamamoto, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 1221 days.

(21) Appl. No.: 12/541,682

(22) Filed: Aug. 14, 2009

(65) Prior Publication Data

US 2010/0053650 A1   Mar. 4, 2010

(30) Foreign Application Priority Data

Aug. 27, 2008 (JP) .................... 2008-217722

(51) Int. Cl.
H04N 1/60 (2006.01)

(52) U.S. Cl.
CPC .......... H04N 1/603 (2013.01); H04N 1/6097 (2013.01)

(58) Field of Classification Search
USPC ............... 358/1.9, 518, 523; 399/45; 345/600
See application file for complete search history.

(56) References Cited

U.S. PATENT DOCUMENTS

| 5,666,470 | A * | 9/1997 | Parker ............................ 358/1.6 |
| 6,351,320 | B1 * | 2/2002 | Shin ................................ 358/1.9 |
| 6,827,418 | B2 | 12/2004 | Otokita |
| 7,510,277 | B2 * | 3/2009 | Konno et al. ................ 347/102 |
| 7,583,404 | B2 * | 9/2009 | Kakutani ........................ 358/1.9 |
| 7,903,281 | B2 * | 3/2011 | Encrenaz et al. ............. 358/1.9 |
| 7,929,180 | B2 * | 4/2011 | Konji .............................. 358/1.9 |
| 2003/0002064 | A1 * | 1/2003 | Otsuki ........................ 358/1.13 |
| 2004/0212825 | A1 * | 10/2004 | Sai et al. ...................... 358/1.15 |
| 2005/0068362 | A1 | 3/2005 | Otokita |
| 2007/0291077 | A1 * | 12/2007 | Seki et al. ........................ 347/37 |
| 2008/0246982 | A1 * | 10/2008 | Kaneko et al. ................ 358/1.9 |
| 2009/0128838 | A1 * | 5/2009 | Yamamoto ..................... 358/1.9 |
| 2010/0045987 | A1 * | 2/2010 | Bonikowski ........ B41F 33/0036 356/402 |

FOREIGN PATENT DOCUMENTS

| JP | 2003011467 | 1/2003 |
| JP | 2003237115 | 8/2003 |

* cited by examiner

Primary Examiner — Nicholas Pachol

(57) ABSTRACT

An image processing device, an image processing method, and an image processing program stored on a computer-readable medium can select a color conversion table based on an image deposition level and are not dependent upon the media setting specifying the print medium. A host computer 3 outputs output data for printing to a printer that prints using cyan (C), magenta (M), and yellow (Y) inks, and has a color conversion table storage unit 260 that stores color conversion tables for each type of paper ranked according to the ink deposition level, a color conversion table selection unit 225, a color conversion unit 230, and a halftone processor 240. The color conversion table selection unit 225 selects a color conversion table from the color conversion table storage unit 260 with priority given to the ink deposition level over the paper setting. The color conversion unit 230 converts bitmap data for printing to CMY image data based on the selected color conversion table. The halftone processor 240 generates the output data based on the CMY image data.

19 Claims, 7 Drawing Sheets

IMAGE PROCESSING DEVICE, IMAGE PROCESSING METHOD, AND IMAGE PROCESSING PROGRAM

CROSS-REFERENCE TO RELATED APPLICATIONS

Japanese Patent application No. 2008-217722, filed Aug. 27, 2008, is hereby incorporated by reference in its entirety.

BACKGROUND

1. Field of Invention

The present invention relates to an image processing device, an image processing method, and an image processing program stored on a computer-readable medium that combines recording materials (e.g. ink) of plural different colors such as cyan (C), magenta (M), and yellow (Y).

2. Description of Related Art

When images are printed by printers that print using plural colors of ink, part or all of the chromatic color ink, i.e. cyan (C), magenta (M), and yellow (Y) is replaced by a neutral or achromatic ink such as black (K) to form dots. Controlling printing on such printers requires inputting image data, referencing a color conversion table, and converting the colors in the input image data to the corresponding colors defined in the color conversion table to produce a color-converted image.

This color conversion table is a lookup table that defines the correlation between the colors before and after conversion. More specifically, the table correlates colors expressed as gradations of red (R), green (G), and blue (B) to the amount of cyan (C), magenta (M), and yellow (Y) ink that is deposited when printing.

Printers commonly have several different color conversion tables, and the color conversion table that is referenced changes according to the printer settings. Japanese Unexamined Patent Appl. Pub. JP-A-2003-237115, for example, discloses a method of acquiring printing conditions such as the number of passes, type of media, resolution, and dot size, and color converting the image data to change the ratio of chromatic ink to achromatic ink according to the acquired printing conditions. More specifically, separate lookup tables are provided according to the number of passes, type of media, resolution, and dot size, the lookup tables matching the printing conditions are selected, and the color conversion process is controlled according to the selected lookup table.

Because lookup tables are predefined for specific parameters such as the number of passes, media type, resolution, and dot size, the method taught in JP-A-2003-237115 does not allow for selections exceeding the preconfigured settings. More specifically, if the media type is set to plain paper, for example, the selected lookup table will always be a lookup table for plain paper. Because the color conversion tables are generally designed to yield the desired printing results when selected, color conversion tables that deviate from the settings are not selected.

However, if the print medium setting is set to plain paper but the quality of the plain paper that is actually loaded for use is poor, the expected printing results cannot be achieved even by referencing a predesigned color conversion table. It is desirable in such situations for the user to be able to actively change the color conversion table that is referenced for printing. However, because the user will not necessarily know enough about color conversion tables, a complicated process must be used to select the color conversion table.

Furthermore, in addition to being used for color conversion table selection, the settings input to a printer configuration screen are also reflected in the operating settings of such mechanical components as the carriage and paper transportation mechanism, and the print head. More specifically, once the print medium is selected in the printer configuration screen, the color conversion table to be referenced is selected and the operation of the mechanical components is configured. As a result, if the print medium selected in the printer configuration screen is changed in order to change the color conversion table that is used, the operating settings of the mechanical components also changes. For example, if the user actually wants to print on plain paper but the desired print quality will not be achieved because the quality of the paper that is loaded is poor, and the user changes the color conversion table to the color conversion table for "fine paper" in order to increase how much ink is deposited (the print density), it will still be difficult to print as desired because the operation of the mechanical components depends upon the print medium that is selected in the printer configuration screen.

SUMMARY OF INVENTION

The present invention is directed to solving the foregoing problem, and an image processing device, an image processing method, and an image processing program stored on a computer-readable medium according to the invention enable selecting a color conversion table based on how much recording material (e.g. ink) is used instead of depending on a media setting that specifies the print medium.

The invention is directed to resolving at least a part of the foregoing problem, and can be achieved by the embodiments and applications described below.

For simplicity and ease of understanding, the term "ink" will be used herein generically to represent any recording material that can be used for printing, including by way of example and not limited to liquid inks, toner, UV inks, UUV resins, organic printing materials, etc.

A first aspect of the invention is an image processing device that outputs output data to a printing device for printing, the image processing device including a storage unit that stores a color conversion table for each type of print media ranked according to an ink deposition level, a selection unit that selects a color conversion table from the storage unit by giving a specified ink deposition level a higher priority than a medium type setting, a conversion unit that converts first image data for printing to second image data based on the selected color conversion table, and a generating unit that generates the output data based on the second image data.

In this aspect of the invention the color conversion table that is used for conversion to second image data is selected with priority given to the specified ink deposition level over the medium type. More particularly, even if the medium setting specifies a specific type of print medium, a color conversion table corresponding to the specified ink deposition level is selected instead of selecting a color conversion table for the specified medium type. The color conversion table selection is therefore not dependent upon the medium type setting specifying the print medium, and a color conversion table for a type of print medium other than the specified print medium can be selected. The number of selectable color conversion tables is thus increased, and the ink deposition level can be adjusted through a wider range than is possible with the related art.

Furthermore, because a color conversion table can be selected independently of the type of print medium, it is not necessary to provide numerous color conversion tables for each print medium type in order to expand the adjustment range of ink deposition. The color conversion table design process can thus be made more efficient.

In an image processing device according to a second aspect of the invention, the image processing device also has an adjustment unit that adjusts the density of the first image data to a density corresponding to the specified ink deposition level.

Because ink deposition is expressed in steps or levels by an ink deposition level setting, this aspect of the invention enables the user to visually adjust the ink usage. In addition, not only is the color conversion table selected according to the ink deposition level, the density of the first image data is also converted to a density corresponding to the selected deposition level. In other words, not only is the number of color conversion table choices increased so that ink deposition level (i.e. ink usage) can be adjusted through a wider range of values, the density can also be finely adjusted in a plurality of levels even for a single type of print medium.

In an image processing device according to another aspect of the invention, the color conversion table is prepared for a plurality of print quality levels for each print media type, and the selection unit selects the color conversion table corresponding to a print quality setting and the specified ink deposition level.

In addition to color conversion tables designed for the type of print medium, this aspect of the invention also has color conversion tables prepared for a plurality of print quality levels for each print medium type. Because the color conversion table is thus selected according to the print quality setting as well as the specified ink deposition level, ink deposition, i.e. ink usage, can be adjusted in finer increments and high quality printing is possible.

Another aspect of the invention is an image processing method for generating output data that is output to a printing device for printing, including selecting a color conversion table from a storage unit that stores a color conversion table for each type of print medium ranked according to a specified ink deposition level by giving a specified ink deposition level a higher priority than a medium type setting, converting first image data for printing to second image data based on the selected color conversion table, and generating the output data based on the second image data.

Yet another aspect of the invention is a computer-readable medium storing an image processing program for generating output data that is output to a printing device for printing, the image processing program executable by a computer to select a color conversion table from a storage unit that stores a color conversion table for each type of print media ranked according to an ink deposition level by giving a specified ink deposition level a higher priority than a medium type setting, a conversion unit that converts first image data for printing to second image data based on the selected color conversion table, and a generating unit that generates the output data based on the second image data.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the present invention is described below with reference to the accompanying figures.

Figure 1:
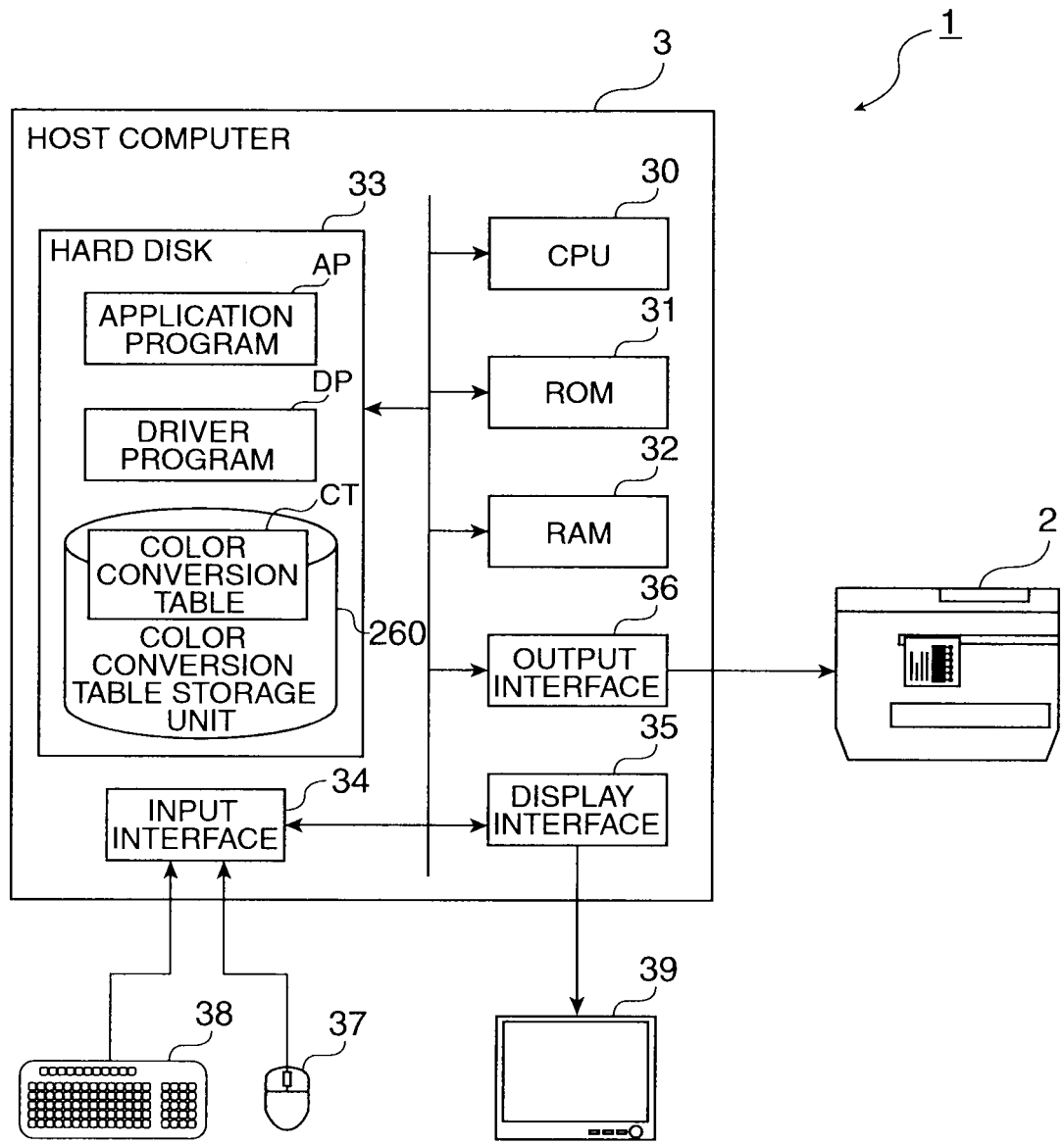
FIG. 1 is a block diagram showing the hardware configuration of a printing system according to a first embodiment of the invention.

FIG. 1 is a block diagram showing the hardware configuration of a printing system according to a first embodiment of the invention. As shown in FIG. 1 the printing system 1 includes an inkjet printer 2 (printing device) and a host computer 3 (image processing device) that controls the inkjet printer 2. The inkjet printer 2 is designed so that an ink cartridge storing cyan (C) ink, an ink cartridge storing magenta (M) ink, and an ink cartridge storing yellow (Y) can be individually installed and removed, and prints a composite black by combining three colors of ink (recording material), cyan (C), magenta (M), and yellow (Y), in the appropriate ratio.

For simplicity and ease of understanding, the term "ink" will be used herein generically to represent any recording material that can be used for printing, including by way of example and not limited to liquid inks, toner, UV inks, UUV resins, organic printing materials, etc.

The configuration of the host computer is described next.

The host computer 3 may be, for example, a personal computer (PC), and has a CPU 30, ROM 31, RAM 32, a hard disk 33, an input interface 34, a display interface 35, and output interface 36. The input interface 34 is the interface to which an input device (operating unit) such as a mouse 37 or keyboard 38 is connected, and receives operating signals in accordance with user operations from an input device. The display interface 35 is an interface to which a display 39 is connected, and controls what is displayed by outputting display data for the screen to the display 39. The output interface 36 is an interface to the inkjet printer 2, and is connected to the inkjet printer 2 by a cable, or other wired or wireless connection.

An application program AP and driver program DP (image processing program) are stored on the hard disk 33 (storage unit). A color conversion table storage unit 260 that stores a color conversion table CT occupies a specific area of the hard disk 33. The application program AP and driver program DP are recorded on a recording medium such as a CD and supplied to the host computer 3. The CD, for example, is read and its contents are stored in the hard disk 33 by an appropriate reading device such as a CD drive (not shown in the figure) located in the host computer 3. Examples of recording media that store the AP and DP programs include floppy disks, optical discs such as CD-ROM and DVD-ROM media, magneto-optical discs, memory cards, portable hard disks, and other types of computer-readable recording media. It will also be evident that instead of supplying the programs using recording media, the programs could be downloaded from a server over a telecommunications link and then recorded to the hard disk 33. Note that the color conversion tables CT are used for the color conversion process described below, and are optimized for different types of paper such as plain paper and fine paper.

The software configuration of the host computer 3 is described next.

Figure 2:
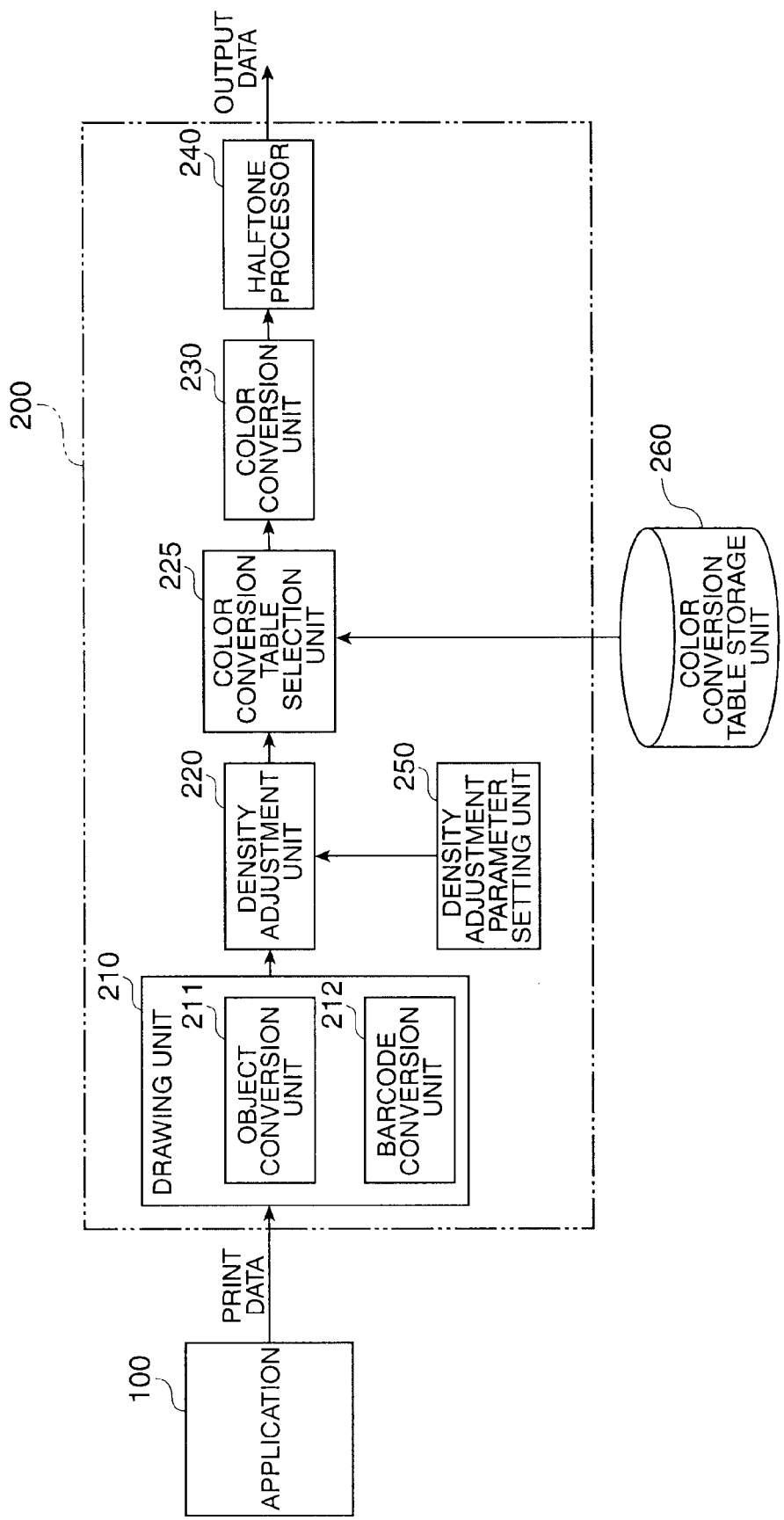
FIG. 2 is a block diagram showing the software configuration of the host computer.

FIG. 2 is a block diagram of the software configuration of the host computer 3. As shown in FIG. 2 the host computer 3 has an application 100 and a printer driver 200.

The application 100 is a barcode generating program that functions as part of the application program AP, and generates print data in a specified language based on text, graphics, images, and other objects input using a mouse 37 and keyboard 38, for example. In addition to selecting a common character font for text objects containing numbers, letters, or other characters, the application 100 also enables selecting a desired barcode font from among a plurality of barcode fonts each conforming to different barcode standards. Print data for barcode printing is generated after the user specifies a particular barcode font for the input text string. In other words, when the user inputs a text string by operating the mouse 37 and keyboard 38, for example, and specifies a barcode font for the input character string, the application 100 generates print data for barcode printing including the input text string and the specific barcode descriptor.

The printer driver 200 is software for controlling printing by the inkjet printer 2, and includes a drawing unit 210, density adjustment unit 220 (adjustment unit), a color conversion table selection unit 225 (selection unit), a color conversion unit 230 (conversion unit), a halftone processor 240 (generating unit), and a density adjustment parameter setting unit 250. Note that each of these units are functional units implemented by the CPU 30 reading the driver program DP stored on the hard disk 33 and executing the driver program DP in conjunction with ROM 31 and RAM 32.

Drawing Process

The drawing unit 210 includes an object conversion unit 211 and a barcode conversion unit 212. The object conversion unit 211 interprets the text for which a normal human-readable text font is specified, graphics, images, and other object descriptions contained in the print data received from the application 100, and converts the text, graphics, and image data into RAM 32.

The barcode conversion unit 212 interprets the objects for which a barcode font is specified, generates a barcode corresponding to the text string according to the barcode standard of the specified barcode font, and converts the resulting barcode image data into RAM 32.

Bitmapped data (first image data) corresponding to the content described in the print data is generated in RAM 32 as a result of the object conversion unit 211 converting the text, graphics, and image data and the barcode conversion unit 212 converting the barcode image data. Note that the bitmap data in this embodiment of the invention is data representing the gray level of each channel of each pixel in the image data, and more specifically is image data in an RGB format (referred to below as "RGB image data") representing the density of each color red (R), green (G), and blue (B) as one of 256 levels ranging from 0 to 255. RGB image data expresses a neutral achromatic color when each of the RGB gradation levels is the same with (R, G, B)=(0, 0, 0) representing black, that is, the neutral color with the highest density, and (R, G, B)=(255, 255, 255) representing white, that is, the lowest density achromatic color.

Density Adjustment Process

The density adjustment unit 220 applies a density adjustment process to adjust the print density of each channel for each pixel. The density adjustment unit 220 sets the adjustment value ΔV for adjusting the density according to the ink deposition level (ink usage level) specified by the user as the usage setting for setting the ink usage level.

Figure 3:
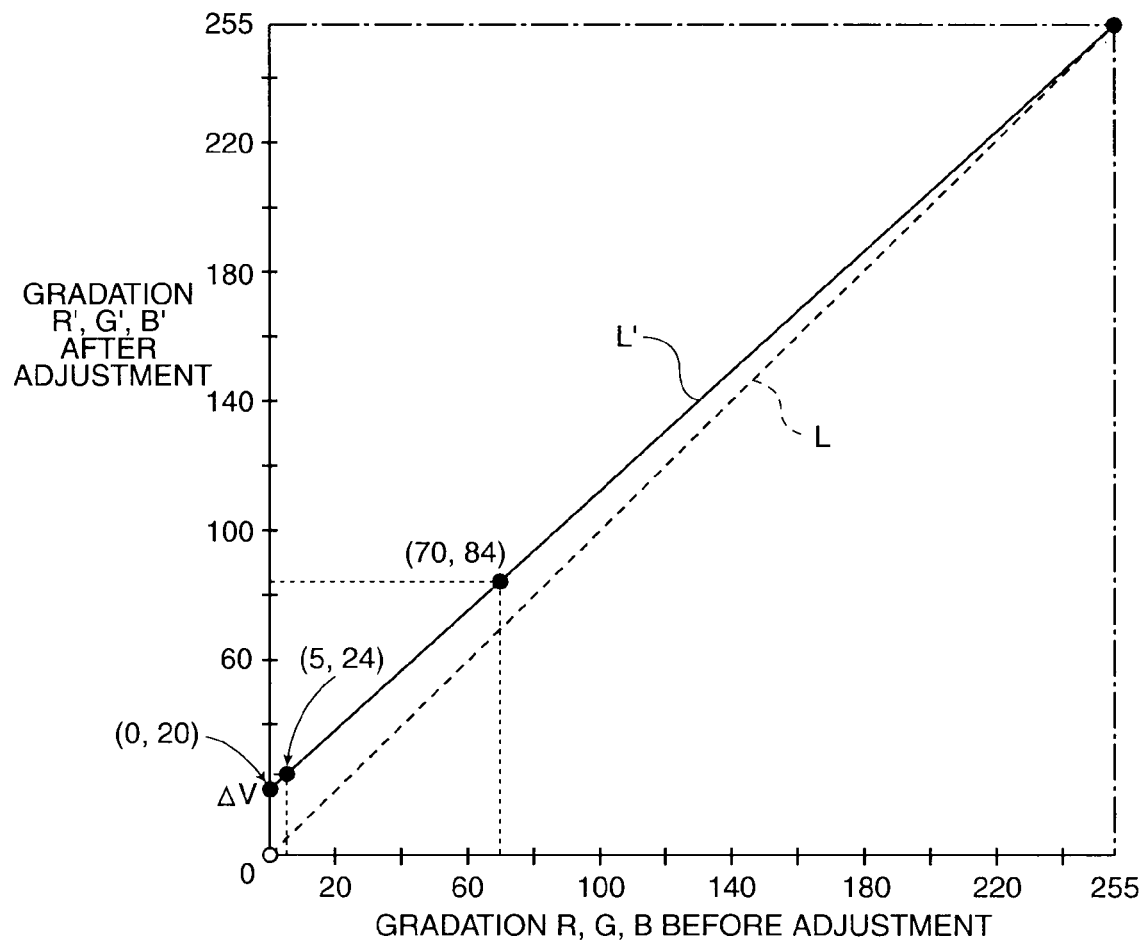
FIG. 3 shows the density adjustment process.

FIG. 3 shows the gray levels before and after adjustment by the density adjustment process with the x-axis showing the (R, G, B) density values before adjusting the density of the RGB image data, and the y-axis showing the (R', G', B') density values after density adjustment. As shown in FIG. 3, the density adjustment process adjusts and converts the density values (R, G, B)=(0, 0, 0) corresponding to black before adjustment by the adjustment value ΔV (≥0) to obtain the adjusted density values (R', G', B')=(ΔV, ΔV, ΔV). The gray level of the pre-adjustment density values (R, G, B)=(255, 255, 255) corresponding to white is not changed, and the white density values are simply converted to (R', G', B')= (255, 255, 255). The gradation levels of gray tones with lower density than black (0<R, G, B<255) are converted to change continuously linearly from the gray level (R', G', B')=(ΔV, ΔV, ΔV) corresponding to black after density adjustment to the gray level (R, G, B)=(255, 255, 255) corresponding to white after density adjustment as shown in FIG. 3. By thus adjusting the gradation level of each color red (R), green (G), and blue (B) by the same adjustment value, the density adjustment process can adjust the density of blacks and grays and generate R'G'B' image data while maintaining the neutrality of neutral colors in the RGB image data.

The conversion shown in FIG. 3 can be applied to each of the red (R), green (G), and blue (B) channels. The broken line L is a function denoting gradation before density adjustment. If the density is adjusted by the adjustment value ΔV, the function denoting the gradation after adjustment is a specific function (denoted by solid line L') of which adjustment value ΔV is the intercept. This specific function is further described below. Note that when the gray level is adjusted (ΔV(≥0)) as shown in FIG. 3, the amount of ink used to print black (R', G', B')=(ΔV, ΔV, ΔV) decreases, and ink bleeding can therefore be reduced during printing.

The adjustment value ΔV used in the density adjustment process for adjusting the density of each channel of each pixel described above is set by the density adjustment parameter setting unit 250. In this embodiment of the invention the density adjustment parameter setting unit 250 sets the adjustment value ΔV according to the specified ink deposition level.

Figure 4:
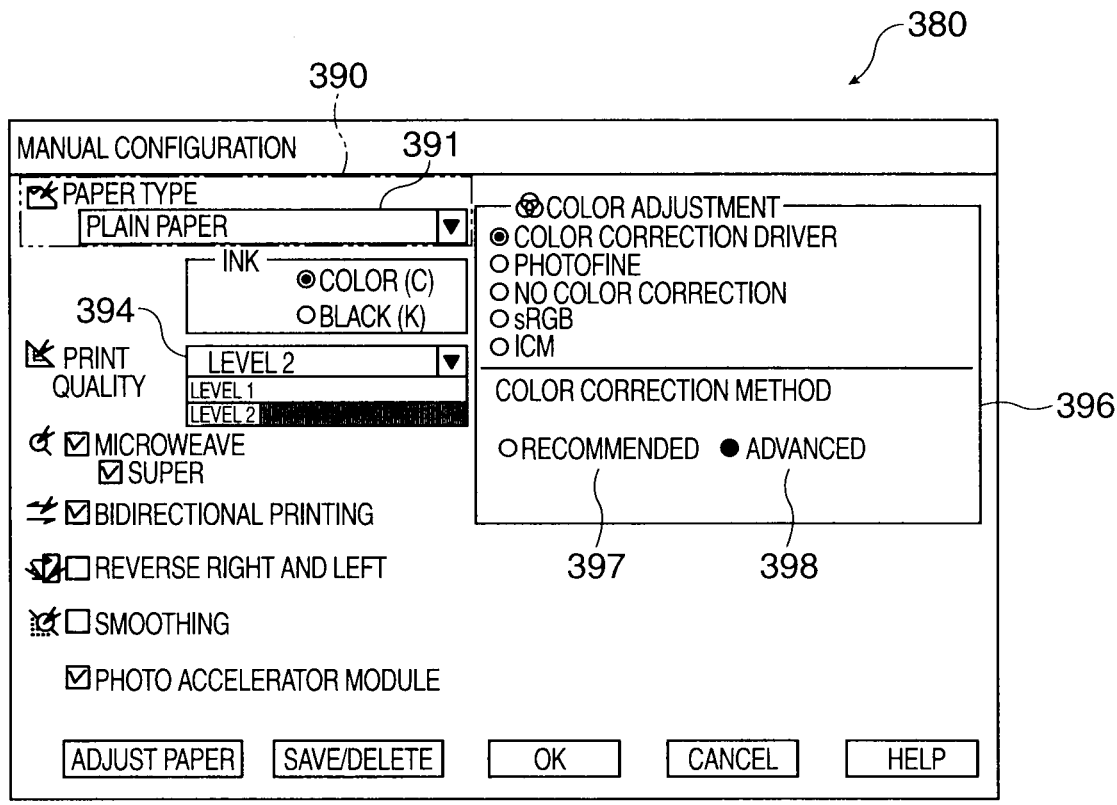
FIG. 4 shows an example of a printer configuration screen.

FIG. 4 shows an exemplary printer configuration screen. As shown in FIG. 4, the ink deposition level can be input and set using the printer configuration screen presented on the display 39 through the display interface 35.

The printer configuration screen 380 includes, for example, a paper type selection unit 390, a print quality selection unit 394, and a color correction method selection unit 396. Using the mouse 37 or keyboard 38, for example, the user can input a paper type setting (media setting) specifying the type of paper in the paper type selector 391 of the paper type selection unit 390. In this embodiment of the invention the print medium can be selected from among a plurality of selectable options including plain paper and fine paper, for example.

The print quality selection unit 394 enables selecting the print quality setting to set the print quality. This embodiment of the invention enables selecting either of two levels, level 1 and level 2, according to the printing resolution, with level 1 denoting a higher printing resolution than level 2.

The color correction method selection unit 396 enables selecting either the recommended settings 397 or advanced settings 398. If the recommended settings 397 are selected, color correction is applied automatically according to the parameters set for the paper type and print quality settings. If the advanced settings 398 are selected, the color adjustment screen 400 shown in FIG. 5 is presented.

Figure 5:
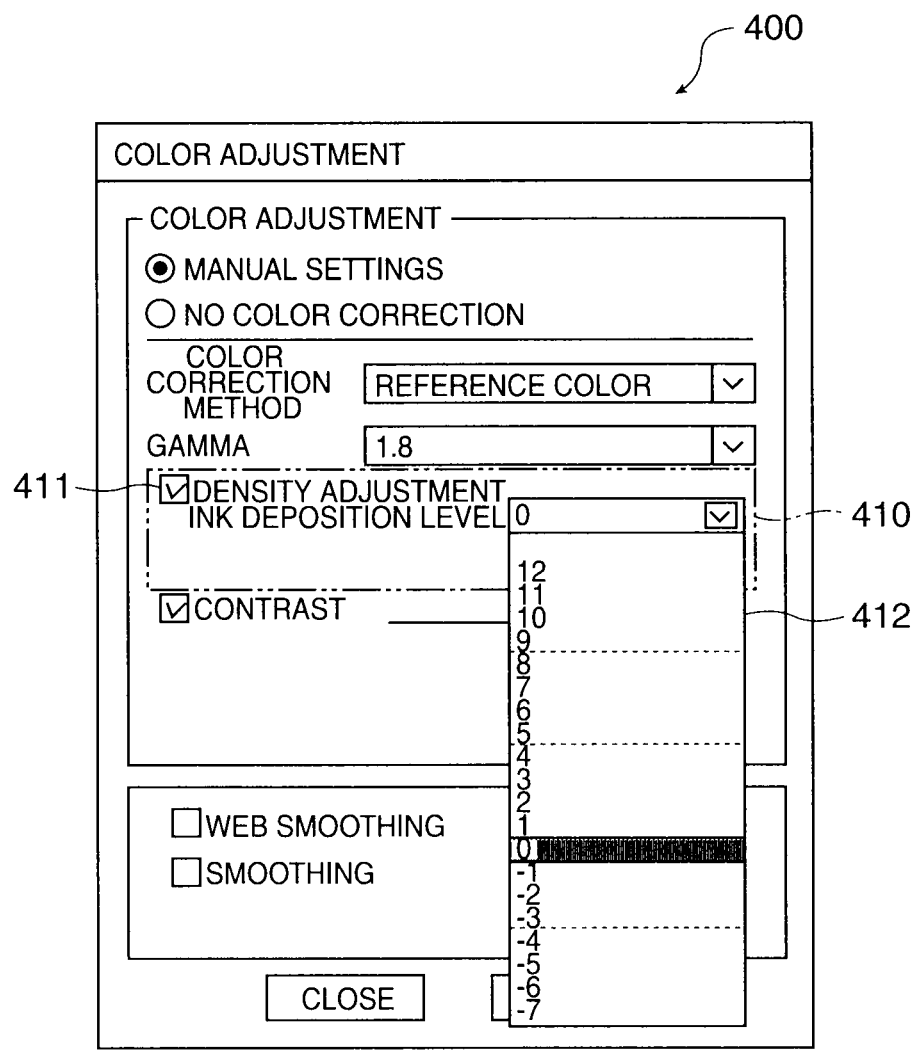
FIG. 5 shows an example of a color adjustment screen.

FIG. 5 shows an exemplary color adjustment screen 400. As shown in FIG. 5 the density adjustment setting unit 410 of the color adjustment screen 400 has a check box 411 for setting whether density adjustment is applied, and an ink deposition level selector 412. The ink deposition level is set from level −7 to level 12 according to the amount of ink consumed, and can be set to one of 20 levels in this embodiment of the invention. Ink consumption increases as the ink deposition level rises in this embodiment of the invention.

Color Conversion Table Selection Process

Figure 6:
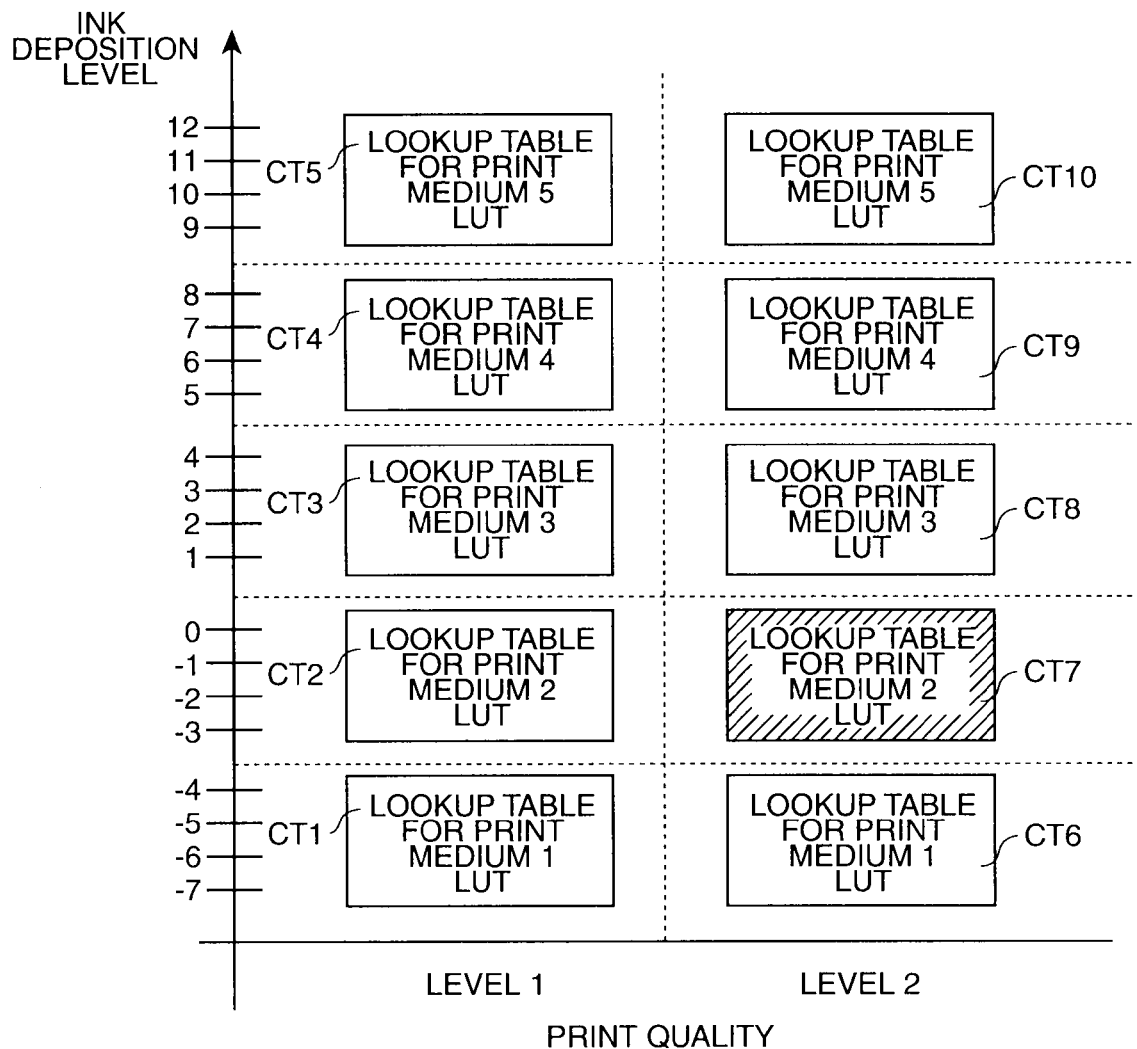
FIG. 6 shows the color conversion tables stored in the color conversion table storage unit.

FIG. 6 shows the color conversion tables stored in the color conversion table storage unit 260 of the hard disk 33. The color conversion table storage unit 260 stores color conversion tables for each paper type as tables ranked according to the ink deposition level. Color conversion tables are also provided for plural print quality levels for each paper type. In other words, the color conversion table that is selected can be changed according to the print quality.

More specifically, if an ink deposition level from 0-3 is selected from the color adjustment screen 400 shown in FIG. 5, the color conversion table selection unit 225 selects a lookup table for print medium 2 (that is, CT2 or CT7) as shown in FIG. 6.

If an ink deposition level from −4 to −7 is selected, a lookup table for print medium 1 (CT1 or CT6) is selected.

If an ink deposition level from 1 to 4 is selected, a lookup table for print medium 3 (CT3 or CT8) is selected.

If an ink deposition level from 5 to 8 is selected, a lookup table for print medium 4 (CT4 or CT9) is selected.

If an ink deposition level from 9 to 12 is selected, a lookup table for print medium 5 (CT5 or CT10) is selected.

The color conversion table selection unit 225 selects the lookup table corresponding to the print quality level set in the print quality selection unit 394 of the printer configuration screen 380 shown in FIG. 4. If level 1 is selected in the print quality selection unit 394, a lookup table corresponding to the ink deposition level and print quality level 1 (one of tables CT1 to CT5) is selected as shown in FIG. 6. If level 2 is selected in the print quality selection unit 394, a lookup table corresponding to the ink deposition level and print quality level 2 (one of tables CT6 to CT10) is selected as shown in FIG. 6.

Color Conversion Process

The color conversion unit 230 executes a process that converts the R'G'B' image data resulting from the density adjustment process to data in accordance with the levels of ink in the inkjet printer 2. Because the inkjet printer 2 has three colors of ink, cyan (C), magenta (M), and yellow (Y), in this embodiment of the invention, the color conversion unit 230 converts each gray level value of the R'G'B' image data and converts the R'G'B' image data to CMY image data (second image data), which is CMY format bitmapped data.

Color conversion by the color conversion unit 230 is executed according to the color conversion table CT selected in the color conversion table selection process described above. The color conversion table CT is a table correlating colors described as gradations of red (R), green (G), and blue (B) to the amount of cyan (C), magenta (M), and yellow (Y) ink that is deposited. More particularly, the RGB values corresponding to black and gray are mapped to the ink deposition levels of the cyan (C), magenta (M), and yellow (Y) inks so that the black and gray colors can be desirably expressed by the combination of cyan (C), magenta (M), and yellow (Y) ink. In other words, the R', G', B' values corresponding to black are converted to CMY color values of which the ink deposition levels are adjusted to achieve composite black, and the R', G', B' values corresponding to gray are converted to CMY color values of which the ink deposition levels are adjusted to achieve the desired gray color.

Halftone Process

The halftone processor 240 applies a halftone process to the CMY image data, and generates output data according to whether or not a particular dot is formed by the inkjet printer 2 when printing.

The printer driver 200 then outputs the output data through the output interface 36 to the inkjet printer 2 to control printing by the inkjet printer 2.

As described above, the printer driver 200 sequentially applies a drawing process, density adjustment process, color conversion table selection process, color conversion process, and halftone process to the print data received from an application 100, and thereby generates output data for printing after adjusting the density of each channel.

Figure 7:
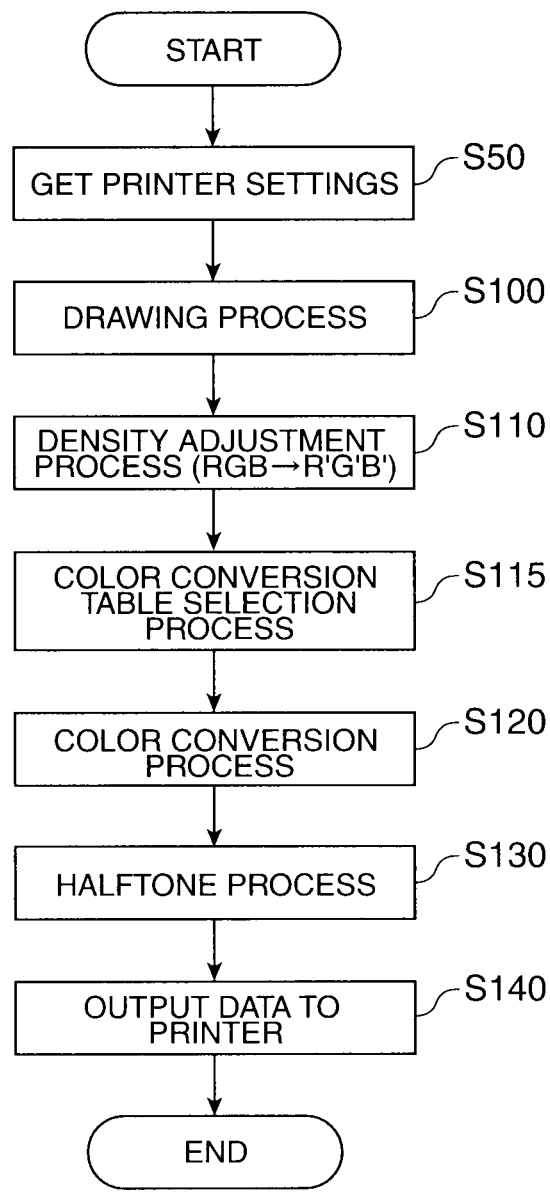
FIG. 7 is a flow chart of the printing process.

The process executed by the printer driver 200 is described next with reference to the flow chart in FIG. 7.

When the application 100 generates print data for barcode printing and the printer driver 200 receives the print data from the application 100, the CPU 30 acquires the parameter settings input to the printer configuration screen 380 and color adjustment screen 400 (step S50). Note that the following description assumes that "plain paper" is selected in the paper type selector 391 of the printer configuration screen 380, "level 2" is selected in the print quality selection unit 394, the advanced 398 setting is selected in the color correction method selection unit 396, and ink deposition level 0 is selected in the density adjustment setting unit 410 of the color adjustment screen 400. The CPU 30 in this situation acquires the following printer settings: paper type=plain paper, print quality=level 2, density adjustment=apply, and the ink deposition level 0. The density adjustment parameter setting unit 250 also stores the adjustment value ΔV setting for adjusting the density according to ink deposition level 0 at a specific address in RAM 32. Note that this adjustment value ΔV is previously set based on an adjustment settings table not shown. This adjustment settings table is a table that defines the adjustment value ΔV according to the paper type, print quality, and ink deposition level settings.

The CPU 30 then applies the drawing process to the print data received from the application 100 (step S100). This step interprets any text string for which a barcode font is specified in the received print data, and converts the barcode image data into working memory in RAM 32. When other print data content such as text for which a normal human readable font is specified, graphics, and images is contained in the received print data, the CPU 30 applies a regular drawing process to interpret the print data and convert the image data to bit-mapped data in working memory in RAM 32. The process executed in step S100 thus writes RGB image data to RAM 32.

The CPU 30 then executes a process to adjust the density of each channel of each pixel in the RGB image data (step S110). This density adjustment process first reads the printer settings acquired in step S50 from RAM 32 and acquires the adjustment value ΔV, and converts the RGB image data to R'G'B' image data by applying the following equations (1) to (3) to each color gradation value (R value, G value, B value) in the RGB image data.

$$R'=R\times\{(255-\Delta V)/255\}+\Delta V \quad (1)$$

$$G'=G\times\{(255-\Delta V)/255\}+\Delta V \quad (2)$$

$$B'=B\times\{(255-\Delta V)/255\}+\Delta V \quad (3)$$

The density adjustment unit 220 executes the density adjustment process based on the adjustment value ΔV set by the density adjustment parameter setting unit 250 referencing the adjustment settings table not shown and equations (1) to (3) above. For example, as shown in FIG. 3, if the adjustment value ΔV=20, the density is adjusted by converting the (R, G, B)=(0, 0, 0) values denoting black to (R', G', B')=(20, 20, 20), converting the (R, G, B)=(255, 0, 0) values denoting red to (R', G', B')=(255, 20, 20), and converting the (R, G, B) (255, 70, 5) values denoting orange to (R', G', B')=(255, 84, 24).

Based on the printer settings acquired in step S50, the CPU 30 then executes the color conversion table selection process (step S115). The color conversion table selection unit 225 selects the color conversion table CT corresponding to the ink deposition level from the color conversion table storage unit 260 with priority for the ink deposition level rather than the paper type setting. If the print quality setting has been acquired, the color conversion table CT is selected according to the print quality setting and the ink deposition level.

The CPU 30 then references the color conversion table CT selected in step S115 and color converts the R'G'B' image data output from the density adjustment process to CMY image data (step S120). Note that the color conversion table CT correlates the RGB values to the CMY values achieving each color. Furthermore, because the RGB values for black correspond to the CMY values for composite black, the R'G'B' values corresponding to black are converted to the CMY values for composite black.

The CPU 30 then applies a halftone process to the CMY image data and generates output data denoting the presence of each dot (step S130), and outputs the output data through the output interface 36 to the inkjet printer 2 (step S140). The inkjet printer 2 then prints an image including the barcode described in the print data and any other objects by discharging ink droplets according to the output data received from the host computer 3 and forming dots on the surface of the paper or other print medium.

Note that step S100 is a process executed by the CPU 30 as the drawing unit 210, step S110 is a process executed by the CPU 30 as the density adjustment unit 220, step S115 is a process executed by the CPU 30 as the color conversion table selection unit 225, step S120 is a process executed by the CPU 30 as the color conversion unit 230, and step S130 is a process executed by the CPU 30 as the halftone processor 240.

As described above, this embodiment of the invention prioritizes the ink deposition level over the paper type when selecting the color conversion table CT that is used for conversion to CMY image data representing the ink deposition level. More specifically, even if the paper type is set to a specific type of paper, a color conversion table for the specified paper type is not automatically selected, and a color conversion table CT is selected according to the ink deposition level. The color conversion table selection is therefore not dependent upon the paper type, and a color conversion table for a type of paper other than the specified paper type can be selected. The color conversion table to be used can therefore be selected from a greater number of options, and ink usage can be adjusted more broadly than is possible with the related art.

Furthermore, because a color conversion table CT superseding the paper type selection can be selected, this embodiment of the invention does not need to provide different color conversion tables for each paper type in order to expand the ink usage adjustment range. The color conversion table CT design process can thus be made more efficient. In this embodiment of the invention there are two color conversion tables corresponding to the selected print quality level for each paper type. For example, there are two color conversion tables for print medium 1, table CT1 for print quality level 1 and table CT2 for print quality level 2, but even when print medium 1 is set as the paper type, one of the color conversion tables (CT3 to CT10) other than these two can be selected according to the ink deposition level.

Furthermore, because ink usage is expressed using stepped ink deposition levels, this embodiment of the invention enables the user to visually adjust the ink usage. In addition, not only is the color conversion table selected according to the ink deposition level, the density of the bitmap data received from the application is also converted to a density corresponding to the ink deposition level. In other words, not only is the number of color conversion table choices increased so that ink usage can be adjusted through a wider range of values, the print density can also be finely adjusted in a plurality of levels even for a single type of paper.

In addition to the color conversion tables being prepared for each paper type, the tables also accommodate plural print quality levels for each paper type. Because a color conversion table corresponding to both the ink deposition level and the print quality setting is selected, the ink usage adjustment width can be set in smaller increments and high quality printing is possible.

It will be obvious to one with ordinary skill in the related art that the invention is not limited to the foregoing embodiment and can be varied in many ways without departing from the scope of the accompanying claims. Some examples of such variations are described below.

Variation 1

The foregoing embodiment executes the density adjustment process using a linear gradation conversion such as shown in equation (1), but the method of the density adjustment process is not so limited. For example, to suppress changing the density of gray by the density adjustment process when the black density is adjusted by adjustment value ΔV, gray scale conversion in the density adjustment process may follow a convex gradation conversion curve below the line connecting the level corresponding to black and the level corresponding to white. Because changing the density of gray colors can be suppressed while adjusting the density of black, the density of colors producing a density change can be adjusted in a more limited range than black.

Variation 2

The foregoing embodiment is described with the drawing unit 210 generating the RGB image data, but when printing in monochrome or when only a barcode is contained in the print data, the drawing unit 210 may execute a process that generates gray scale image data (first image data) and applies the processes following the density adjustment process to the monochrome image data.

Variation 3

The foregoing embodiment describes rendering composite black using three colors of ink, cyan (C), magenta (M), and yellow (Y), but the ink set is not limited to these colors. For example, in addition to cyan (C), magenta (M), and yellow (Y) inks, the ink set may also include light magenta (LM) that is brighter than magenta (M) ink, light cyan (LC) that is brighter than cyan (C) ink, and light yellow (LY) that is brighter than yellow (Y), or red (R), green (G), and blue (B) inks may be added, and composite black may be rendered using a combination of four or more inks.

Variation 4

The foregoing embodiment is described using an inkjet printer by way of example, but the printing device is not so limited, and other types of printers that render black by printing composite black, such as dot impact printers, thermal transfer printers, and laser printers, may be used instead.

Variation 5

The host computer 3 executes the drawing process, density adjustment process, color conversion table selection process, color conversion process, and halftone process in the foregoing embodiment, but the host computer 3 may execute the drawing process, density adjustment process, color conversion table selection process, and color conversion process, and then output the data resulting from the color conversion process as the output data to the printer. In this configuration the printer applies the halftone process to the received output data, and prints based on the result of the halftone process.

Further alternatively, the printer may be configured to function as the image processing device and apply the drawing process, density adjustment process, color conversion table selection process, color conversion process, and halftone process to print data received from the host computer.

Further alternatively, the host computer may be configured to execute the drawing process and then output RGB image data resulting from the drawing process as the output data to the printer. In this configuration the printer functioning as the image processing device applies the density adjustment process, color conversion table selection process, color conversion process, and halftone process to the print data received from the host computer.

The present invention may be embodied on a computer-readable medium containing instructions (i.e. image processing program) that, when executed by a computer or processing unit(s), performs the method(s) of the present invention. The media may be specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code, instructions or control program include machine code, such as produced by a compiler, and files containing higher level code that are executed by a computer using an interpreter.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An image processing device that outputs output data to a printing device for printing, comprising:
   a storage unit that stores a two-dimensional array of color conversion tables, wherein color conversion tables aligned along a first direction in the two-dimensional array correspond to print quality levels, and color conversion table aligned along a second direction orthogonal to the first direction in the two-dimensional array correspond to ink deposition delta levels, each ink deposition delta level corresponding to a change in color density, said ink deposition delta levels being independent of any specified print medium of the printing device;
   an image adjustment unit that adjusts the color density of first image data for printing in accordance with a specified ink deposition delta level;
   a selection unit that selects from the storage unit a color conversion table from the two-dimensional array in accordance with the specified ink deposition delta level and a specified print quality level;
   a conversion unit that converts the adjusted first image data for printing to second image data based on the selected color conversion table; and
   a generating unit that generates the output data based on the second image data.

2. The image processing device described in claim 1, wherein:
   a particular print quality level is a particular printing resolution.

3. The image processing device of claim 1, wherein the first image data for printing is an inputted bitmap data rendition of a print-out.

4. The image processing device of claim 1, wherein:
   each alignment of color conversion tables along the second direction of the two-dimensional array corresponds to a respective range of ink deposition delta levels, and
   the selection unit selects the selected color conversion table from the alignment of color conversion tables that corresponds to the range of ink deposition delta levels within which the specified ink deposition delta level falls.

5. The image processing device of claim 1, wherein:
   each color conversion table in said two-dimensional array is further correlated to a print medium of the printing device;
   wherein if no ink deposition delta level is specified, then:
      the selection unit selects a color conversion table of the two-dimensional array that lies along a first direction alignment that corresponds to a specified print quality level and that is correlated to the print medium of the printing device; and
      the conversion unit converts the first image data for printing to the second image data based on the selected color conversion table.

6. The image processing device of claim 5, wherein all the color conversion tables within each first direction alignment are correlated to the same respective print medium.

7. The image processing device of claim 6, wherein each second direction alignment of color conversion tables is correlated to a different print medium, and all the color conversion tables within the same second direction alignment are correlated to the same print medium.

8. The image processing device of claim 1, wherein each ink deposition delta level specifies a change in color density of a single, predefined color; and
   the image adjustment unit adjusts the color density of the first image data for printing by changing the single predefined color by the specified ink deposition delta level, and then adjusting the remaining colors of the first image data for printing to established a gradual color changed between the changed, single predefined color and a second predefined color that remains unchanged.

9. The image processing device of claim 8, wherein the single, predefined color is black, the second predefined color that remains unchanged is white, each color in the first image data for printing is in a standard RGB format (i.e. Red, Green, Blue format), the specified ink deposition delta level is denoted as $\Delta V$, and the image adjustment unit adjusts the color density of the first image data for printing in accordance with the following relations:

$$R'=R\times\{(255-\Delta V)/255\}+\Delta V$$

$$G'=G\times\{(255-\Delta V)/255\}+\Delta V$$

$$B'=B\times\{(255-\Delta V)/255\}+\Delta V$$

where R', G', and B' are the adjusted R, G, and B colors, respectively.

10. An image processing method for generating output data that is output to a printing device for printing, comprising:

providing a two-dimensional array of color conversion tables, wherein color conversion tables aligned along a first direction in the two-dimensional array correspond to print quality levels, and color conversion table aligned along a second direction orthogonal to the first direction in the two-dimensional array correspond to ink deposition delta levels, each ink deposition delta level corresponding to a change in color density, said ink deposition delta levels being independent of any specified print medium of the printing device;

adjusting the color density of first image data for printing in accordance with a specified ink deposition delta level;

selecting a color conversion table from the two-dimensional array in accordance with the specified ink deposition delta level and a specified print quality level;

converting the adjusted first image data for printing to second image data based on the selected color conversion table; and generating the output data based on the second image data.

11. The image processing method of claim 10, wherein:
each alignment of color conversion tables along the second direction of the two-dimensional array corresponds to a respective range of ink deposition delta levels, and the selected color conversion table is selected from the alignment of color conversion tables that corresponds to the range of ink deposition delta levels within which the specified ink deposition delta level falls.

12. The image processing method of claim 10, wherein:
each color conversion table in said two-dimensional array is further correlated to a print medium of the printing device;

wherein if no ink deposition delta level is specified, then:
the selected color conversion table lies along a first direction alignment that corresponds to a specified print quality level and is correlated to the print medium of the printing device; and the first image data for printing is converted to the second image data based on the selected color conversion table.

13. The image processing method of claim 10, wherein:
each ink deposition delta level specifies a change in color density of a single, predefined color; and the color density of the first image data for printing is adjusted by changing the single predefined color by the specified ink deposition delta level, and then adjusting the remaining colors of the first image data for printing to established a gradual color changed between the changed, single predefined color and a second predefined color that remains unchanged.

14. The image processing method of claim 13, wherein the single, predefined color is black, the second predefined color that remains unchanged is white, each color in the first image data for printing is in a standard RGB format (i.e. Red, Green, Blue format), the specified ink deposition delta level is denoted as $\Delta V$, and the image adjustment unit adjusts the color density of first image data for printing in accordance with the following relations:

$$R' = R \times \{(255-\Delta V)/255\} + \Delta V$$

$$G' = G \times \{(255-\Delta V)/255\} + \Delta V$$

$$B' = B \times \{(255-\Delta V)/255\} + \Delta V$$

where R', G', and B' are the adjusted R, G, and B colors, respectively.

15. A non-transitory computer-readable medium storing an image processing program for generating output data that is output to a printing device for printing, the image processing program executable by a computer to:

provide a two-dimensional array of color conversion tables, wherein color conversion tables aligned along a first direction in the two-dimensional array correspond to print quality levels, and color conversion table aligned along a second direction orthogonal to the first direction in the two-dimensional array correspond to ink deposition delta levels, each ink deposition delta level corresponding to a change in color density, said ink deposition delta levels being independent of any specified print medium of the printing device;

adjust the color density of first image data for printing in accordance with a specified ink deposition delta level;

select a color conversion table from the two-dimensional array in accordance with the specified ink deposition delta level and a specified print quality level;

convert the adjusted first image data for printing to second image data based on the selected color conversion table; and generate the output data based on the second image data.

16. The non-transitory computer-readable medium of claim 15, wherein:
each alignment of color conversion tables along the second direction of the two-dimensional array corresponds to a respective range of ink deposition delta levels, and the selected color conversion table is selected from the alignment of color conversion tables that corresponds to the range of ink deposition delta levels within which the specified ink deposition delta level falls.

17. The non-transitory computer-readable medium of claim 15, wherein:
each color conversion table in said two-dimensional array is further correlated to a print medium of the printing device;

wherein if no ink deposition delta level is specified, then:
the selected color conversion table lies along a first direction alignment that corresponds to a specified print quality level and is correlated to the print medium of the printing device; and the first image data for printing is converted to the second image data based on the selected color conversion table.

18. The non-transitory computer-readable medium of claim 15, wherein:
each ink deposition delta level specifies a change in color density of a single, predefined color; and the color density of the first image data for printing is adjusted by changing the single predefined color by the specified ink deposition delta level, and then adjusting the remaining colors of the first image data for printing to established a gradual color changed between the changed, single predefined color and a second predefined color that remains unchanged.

19. The non-transitory computer-readable medium of claim 18, wherein the single, predefined color is black, the second predefined color that remains unchanged is white, each color in the first image data for printing is in a standard RGB format (i.e. Red, Green, Blue format), the specified ink deposition delta level is denoted as $\Delta V$, and the image adjustment unit adjusts the color density of first image data for printing in accordance with the following relations:

$$R' = R \times \{(255-\Delta V)/255\} + \Delta V$$

$$G' = G \times \{(255-\Delta V)/255\} + \Delta V$$

$$B' = B \times \{(255-\Delta V)/255\} + \Delta V$$

where R', G', and B' are the adjusted R, G, and B colors, respectively.

* * * * *